United States Patent [19]

Braswell

[11] Patent Number: 5,030,526

[45] Date of Patent: Jul. 9, 1991

[54] AUXILIARY BATTERY

[75] Inventor: Richard R. Braswell, Long Beach, Calif.

[73] Assignee: Richards-Braswell Research Corp., Signal Hill, Calif.

[21] Appl. No.: 548,210

[22] Filed: Jul. 3, 1990

Related U.S. Application Data

[63] Continuation of Ser. No. 312,822, Feb. 21, 1989, abandoned.

[51] Int. Cl.$^5$ .............................................. H01M 6/36
[52] U.S. Cl. ................................................. 429/113
[58] Field of Search ............... 429/110, 113, 116, 118, 429/73, 87, 88

[56] References Cited

U.S. PATENT DOCUMENTS

| | | | |
|---|---|---|---|
| 1,633,224 | 6/1927 | Ogden | 429/73 |
| 3,132,053 | 5/1964 | Krebs | 429/118 |
| 3,275,477 | 9/1966 | Schmid-Wildy | 429/113 |
| 3,437,528 | 4/1969 | Musselman | 429/113 |
| 4,720,439 | 1/1988 | Hruden | 429/113 |
| 4,794,058 | 12/1988 | Thiess | 429/116 |

Primary Examiner—Donald L. Walton
Attorney, Agent, or Firm—Fulwider, Patton, Lee & Utecht

[57] ABSTRACT

An auxiliary battery having a casing divided by a partition member, defines a first compartment, for initial receipt of an electrolytic medium, and a second compartment for subsequent receipt of the electrolytic medium. A valve assembly is disposed within the partition member to selectively pass the electrolytic medium into the second compartment, into contact with electrodes disposed therein, enabling the generation of an electrical current when desired.

2 Claims, 4 Drawing Sheets

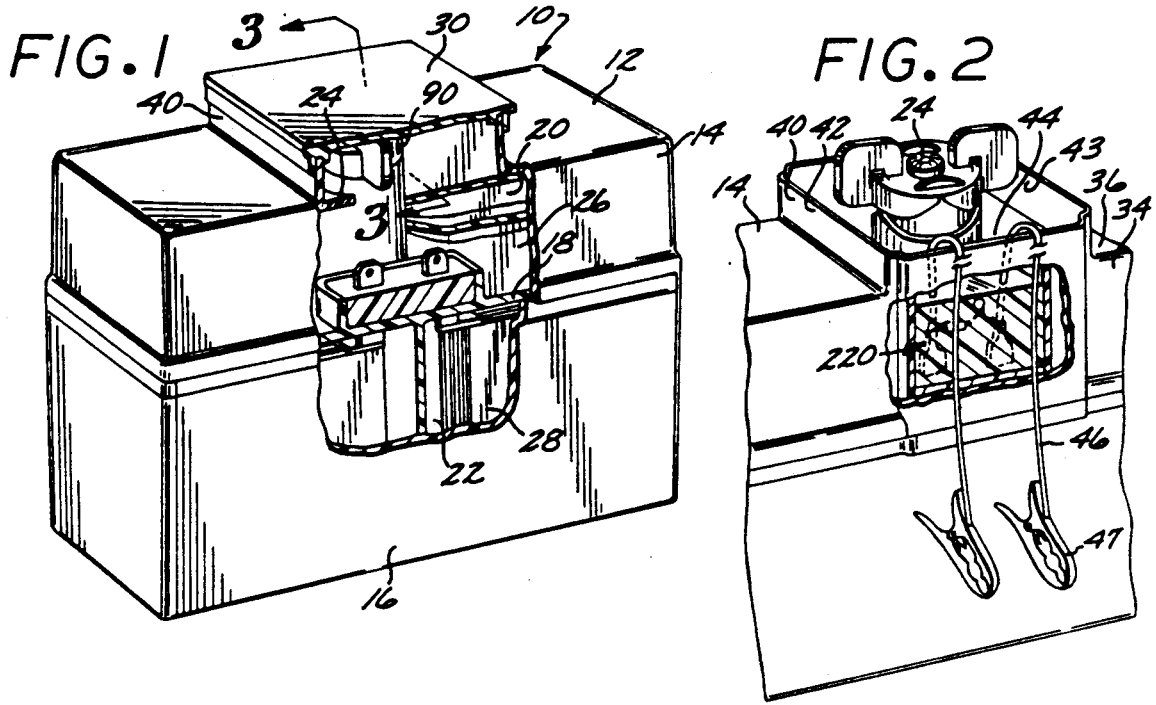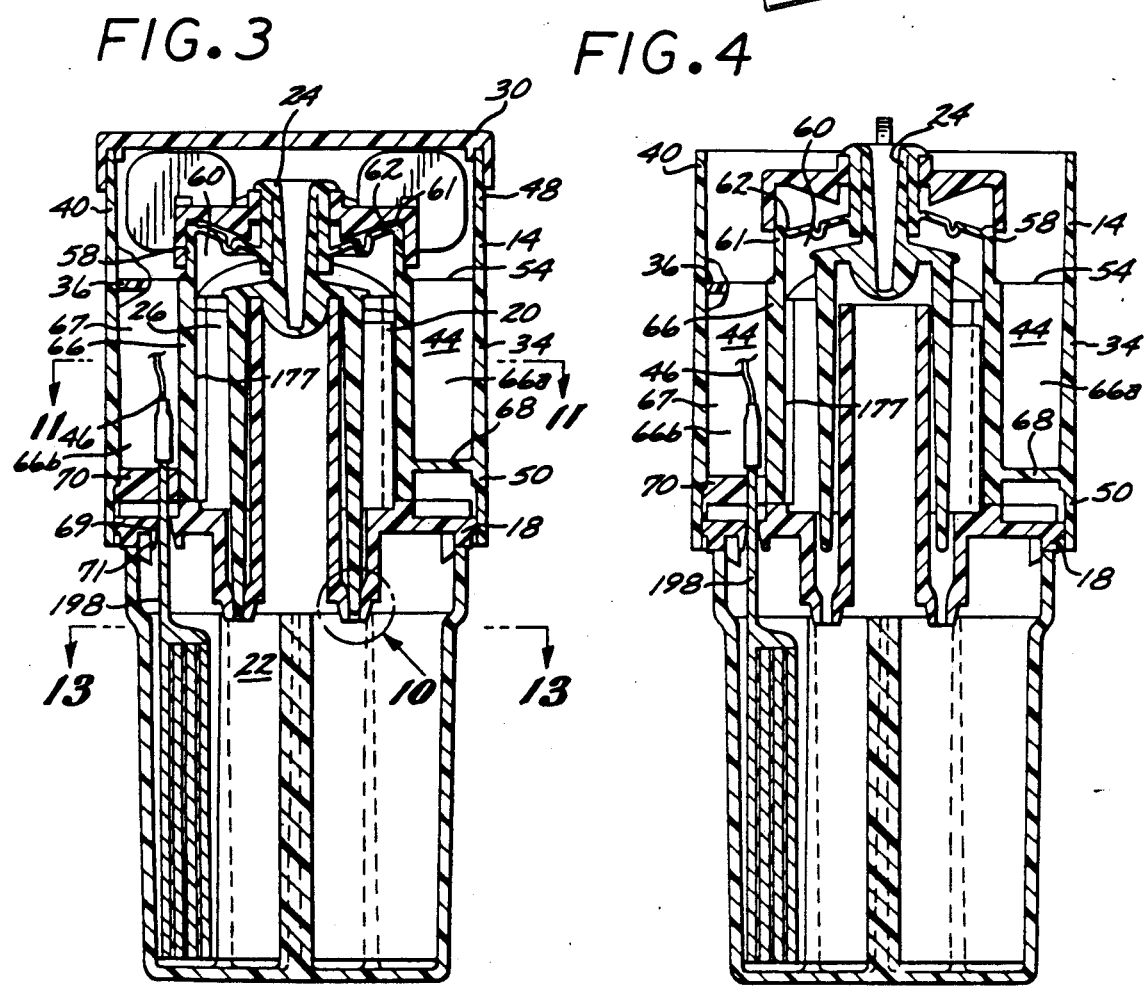

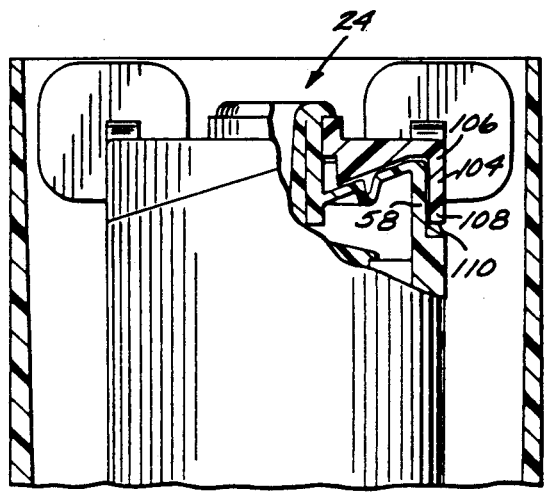
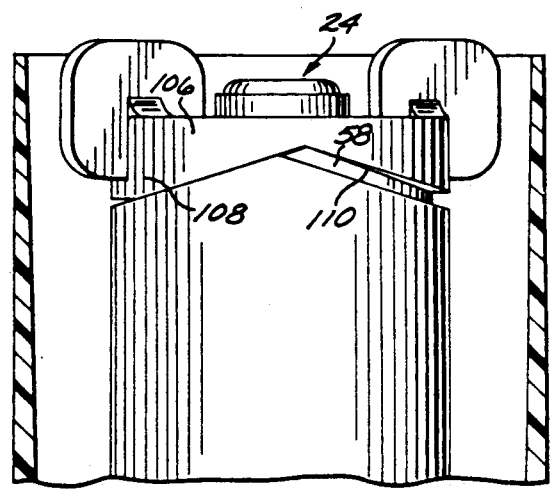
FIG.6        FIG.7
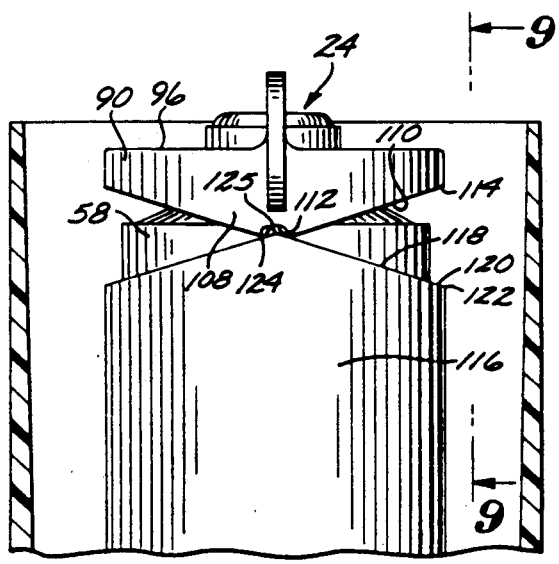
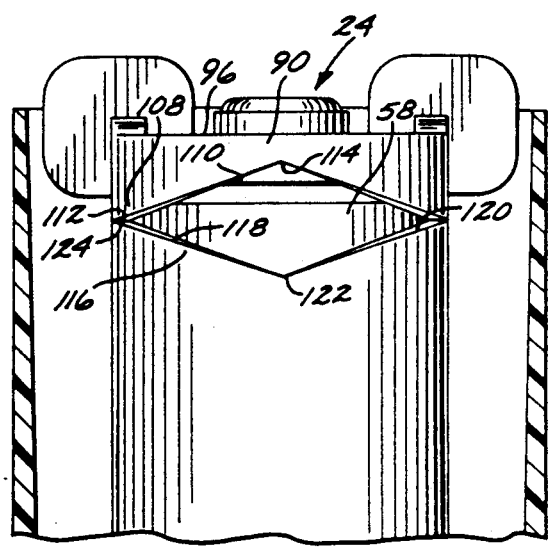
FIG.8        FIG.9

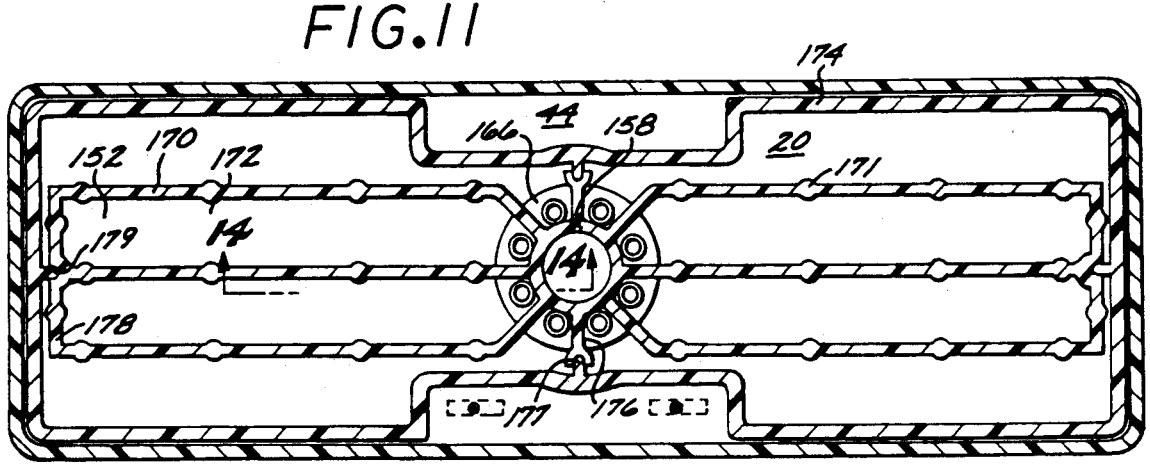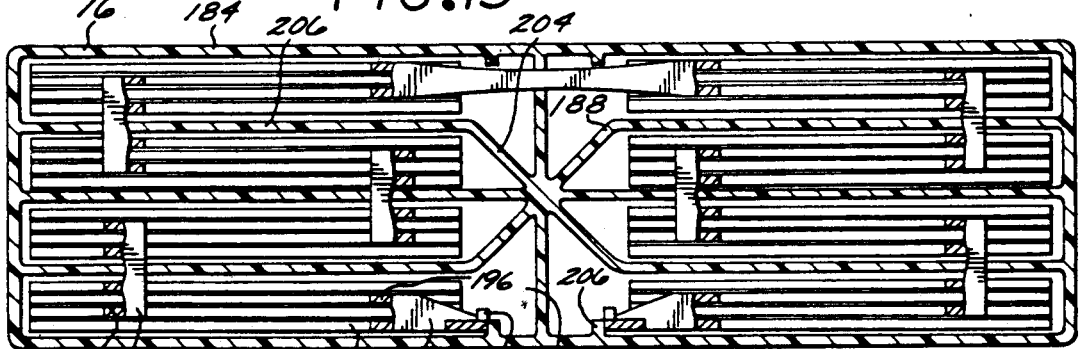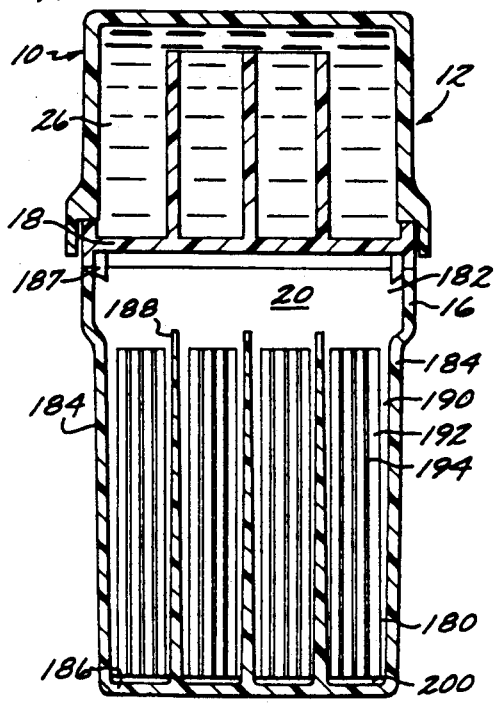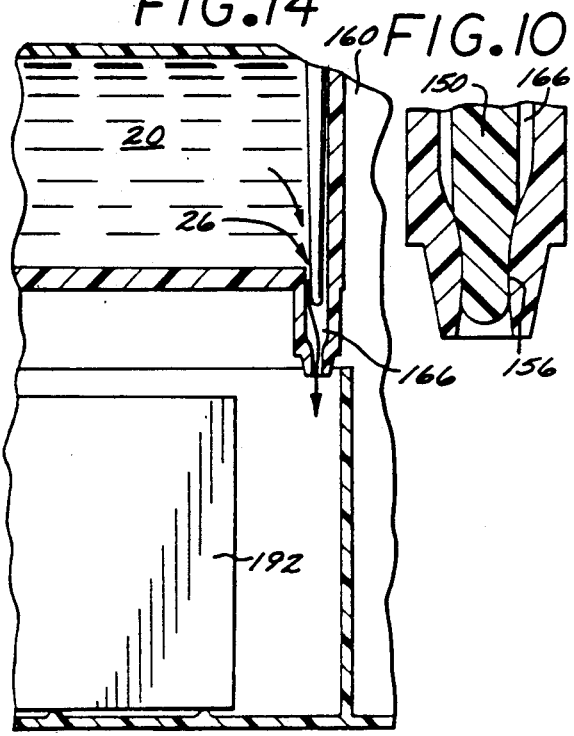

AUXILIARY BATTERY

This application is a continuation of application Ser. No. 07/312,822, filed Feb. 21, 1989, now abandoned.

BACKGROUND OF THE INVENTION

1. Field of the Invention

The present invention relates generally to improvements in electrolyte distribution systems and, more particularly, to a new and improved means of activating an auxiliary battery by discharging a stored electrolyte into the cells of the battery.

2. Description of the Related Art

Batteries may be configured to provide a source of direct current for a variety of uses. When two dissimilar metal electrodes are immersed within an electrolytic medium and connected through an external circuit, an electrical potential difference exists between the electrodes. When the cell is discharged or current is drawn from it, the continuous chemical interaction between the electrodes and the electrolytic medium results in a continuous chemical transformation of the electrodes and the medium into altered electrochemical states. For example, in the familiar lead-acid storage battery, when the cell is discharged, lead sulfate and water are formed from lead and sulfuric acid in the electrochemical reactions.

As long as the various elements are in electrical contact with each other, the electrodes and the electrolytic medium will continually react with each other, converting the various components to their respective base-line electrochemical states, reducing the current that can be generated by the battery. As a result, the battery's effectiveness may decrease with age, that is, impose a finite lifetime or half-life of usability. To retard this decreased effectiveness, consumers often place the smaller sized batteries in a cooler environment, e.g., a refrigerator, to slow-down the chemical reactions and thus the resultant degradation. This method, however, only slows down the conversion process. In addition, in some situations, for example, with automobile batteries, refrigeration of the battery is difficult at best.

Alternatively, the battery may be stored dry, without an electrolyte. When a freshly charged battery is needed, the electrolyte is added to the battery. However, since most electrolytes are strong acids, spillage or inadvertent contact with the electrolyte can occur, causing injury to the operator or damage to the surroundings. In addition, conventional batteries have a plurality of subdivisions or cells for receipt of the electrolyte. As a result, distributing equal amounts of electrolyte to each cell may be tedious and time consuming.

These problems are magnified in batteries used in conjunction with various motor vehicles. Vehicles powered by internal combustion engines are generally started by a battery operated starter motor. These starter motors generally have high current requirements, on the order of about three hundred amperes, for periods of a few seconds. If, however, the vehicle operator has left on an accessory, for example, the vehicle's lights, the battery may be drained and is thus unable to deliver the minimum required charge to the starter motor, leaving the operator unable to start the vehicle. To restart the vehicle, the conventional practice includes electrically connecting the dead battery in parallel with another fully charged battery. However, as is often the case, the stranded vehicle operator may not have the cables to provide the required electrical connection, nor may a second battery even be available for electrical connection with the dead battery. For example, stranded boaters may be alone on an isolated portion of a lake or ocean, with no other boat in sight. In addition, since the unintentional draining of the battery is accidental, a spare active battery carried for such emergencies is subject to the deficiencies earlier described.

For these reasons, motor vehicle operators have recognized the need for an improved electrolyte distribution system which reliably and quickly distributes the electrolyte amongst the cells of a dry charged auxiliary battery for immediate charging of the main battery, providing a fresh source of power available on demand at any time. The present invention provides a means of effectively and efficiently distributing the electrolytes in such auxiliary batteries.

SUMMARY OF THE INVENTION

Briefly and in general terms, an electrolyte distribution system embodying the novel features of the present invention provides a new and improved method and apparatus for providing a fresh direct current source, without fear of degradation and loss of charge with the passage of time. Basically, the present invention provides a new and improved auxiliary battery embodying a novel configuration which selectively separates the electrolytic medium from the electrodes until a charge is needed.

By way of example, and not necessarily by way of limitation, the auxiliary battery of the present invention is directed to an improved battery which stores the electrolytic medium in a first chamber and selectively allows the medium to flow into a second sub-divided chamber, into electrical contact with a plurality of metal electrodes.

In one preferred embodiment, a casing, having first and second enclosure members separated by a partition, is provided which defines the first and second chambers. Electrodes are mounted in the second chamber out of electrical contact with an electrolytic medium disposed in the first chamber. A valve member fluidly connects the first and the second chambers, enabling the operator to selectively and equally distribute the electrolytic medium from the first chamber amongst cells or subdivisions within the second chamber, and thus into electrical contact with the electrodes. As a result an electrical current is generated which is minimally diminished by the natural tendency of the medium and the electrodes to move towards an electrochemical equilibrium with the passage of time.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

FIG. 1 is a fragmentary, perspective view of an electrolyte distribution system embodying the novel features of the present invention.

FIG. 2 is a fragmentary perspective view of the electrolyte distribution system in the open position.

FIG. 3 is a fragmentary sectional view of the present invention taken substantially along the lines 3—3 of FIG. 1 showing the valve assembly in the closed position.

FIG. 4 is a fragmentary sectional view of the present invention similar to FIG. 3 showing the valve assembly in the open position.

FIG. 6 is an enlarged, fragmentary side elevational view of the valve cap of the present invention, in the closed position.

FIG. 7 is an enlarged, side elevational view similar to that of FIG. 6.

FIG. 8 is an enlarged, side elevational view of the valve cap of the present invention, in the open position.

FIG. 9 is an enlarged front elevational view of the valve cap in the open position taken substantially from the lines 9—9 of FIG. 8.

FIG. 10 is an enlarged fragmentary, sectional view of a valve finger and seat of the present invention taken substantially from the circle of FIG. 3.

FIG. 11 is a top plan sectional view taken substantially along the lines 11—11 of FIG. 3.

FIG. 12 is a transverse sectional view of the present invention.

FIG. 13 is a top plan sectional view taken substantially along the line 13—13 of FIG. 3.

FIG. 14 is an enlarged fragmentary elevational view taken substantially along the lines 14—14 of FIG. 11.

DETAILED DESCRIPTION OF THE PREFERRED EMBODIMENTS

Figure 5:
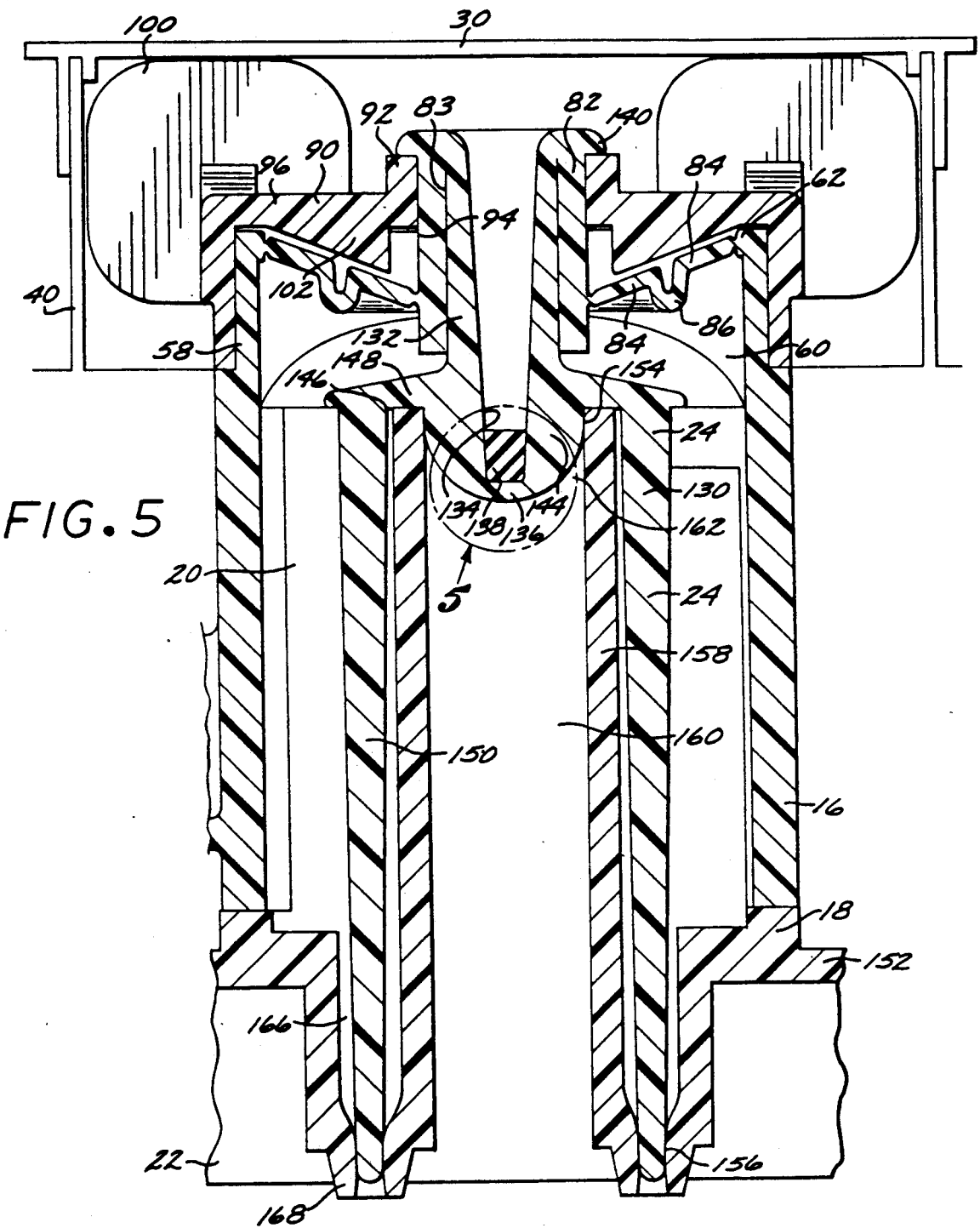
FIG. 5 is an enlarged fragmentary sectional view of the present invention similar to FIG. 3 of the present invention, showing the valve assembly in the closed position.

Referring now to the exemplary drawings for the purposes of illustration, there is shown an improved electrolyte distribution system or storable auxiliary battery 10 embodying the novel features of the present invention.

As best shown in FIG. 1, the electrolyte distribution system 10 includes a casing 12. The casing 12 has an upper or first enclosure member or casing portion 14, and a lower or second enclosure or casing portion member 16 separated by a partition 18 to define a first and second electrolyte chambers, 20 and 22 respectively. A valve assembly 24 fluidly connects the first and second chambers for selective retention and separation of an electrolyte or electrolytic fluid or medium 26, e.g., a solution of sulphuric acid ($H_2SO_4$), which is initially received and held within the first chamber 20, isolated from a plurality of electrodes 28, e.g., metal plates mounted within the second chamber 22. A casing cap 30, snuggly engaged with a neck 40, selectively encloses and helps seal the valve assembly 24 closed as more fully described elsewhere in this application.

While the electrolyte distribution system 10 may be formed of any material resistant or chemically inert relative to the electrolytic medium 26, in the preferred embodiment 17C20 or 17S6A polypropylene may be used. These polypropylenes can be of the brand sold by Rexene Corporation of Pasadena, Texas. This material is chemically resistant/inert and easily moldable. In addition, use of this material allows for joining of the enclosure members and the partition 18 together by heat sealing, providing good fluid seals.

Referring now to FIG. 2, the first enclosure member 14, having a first central vertical axis and includes a plurality of peripheral exterior side walls 34, joined along their respective edges to each other and along their respective top edges to an enclosing top wall 36. While the first enclosure member 14 can be any geometric shape, the preferred embodiment is generally box-like. For example, the top enclosure 14 may be about five and one half inches long, about one and three quarters inches deep, and about one and three quarters of an inch wide.

Positioned generally medially between opposite longitudinal ends of the upper enclosure member 14 is the neck 40 which extends upward from the top enclosing wall 36 in a second direction substantially opposite that of the side walls 34. The neck 40 is formed by generally vertical panels 42, which extend upward from the plane of the enclosing wall 36, and portions of the side walls 34. The neck 40 defines a hollow interior which terminates in an aperture 43, connecting an interior storage compartment 44 with the outside. Connector cables 46, each terminating at a first or distal end in retachable connectors 47, are stored within the storage compartment 44. The cables 46 are in electrical connection with the electrodes 28 and extendable from the electrolyte distribution system 10, for connection to the device requiring a fresh source of direct current. Electrically connected between the cables 46 is a test circuit 220.

Referring now to FIG. 3, the casing cap 30 snuggly engages the neck 40. In addition, the first or upper enclosure member 14 is generally vertically aligned with and mounted upon the partition 18. The upper enclosure member 14, has a first or enclosed end 48, a second or open end 50, and has the open end mounted upon the partition member 18 to define together, with the partition member, the first electrolyte chamber 20 for initial receipt of the electrolytic medium 26.

As best shown in FIG. 4, removal of the casing cap 30 accesses the valve assembly 24, allowing the operator to selectively open the valve, activating the battery as described in more detail later in this application.

As best shown in FIGS. 3 and 4, the upper enclosure 14 includes a generally horizontal connecting platform 54. The connecting platform 54 extends between the peripheral side walls 34 and is at a first generally horizontal level generally coplanar with the top enclosing wall 36. Extending in a first direction upward from the connecting platform 54 are generally vertical first interior support walls 58. These support walls 58 extend upward from the connecting platform 54 and define a first communicating passageway 60. In the preferred embodiment, the support walls 58 are in the form of a cylindrical or tubular portion and parallel to the side walls 34, having its central longitudinal axis concentric with the central vertical axis of the electrolytic distribution system 10. In addition, portions of the support walls may be substantially planar, extending generally tangentially from the tubular portions. At a distal end 61 of the support walls 58, remote from the connecting platform 54, an annular lip 62 extends radially inward from the support walls 58 into the communicating passageway 60. By extending upward beyond the generally horizontal plane of the enclosing wall 36, portions of the support walls 58 and the lip 62 are positioned a sufficient distance from the partition 18 to be above the level of the electrolytic medium 26 contained within the first electrolyte chamber 20 For example, the distal end 61 may be about one-quarter of an inch above the plane of the connecting platform 54.

In addition, a second plurality of generally vertical interior walls 66 extend in a second direction, generally downward from the platform 54. In the preferred embodiment, the second plurality 66 includes a third plurality of generally vertical interior walls 66a which joins with a generally horizontal connecting wall 68 adjacent the open end 50 of the first enclosure 14 to define, along with the peripheral side walls 34, a portion of the storage compartment 44 and thus fluidly separate the storage compartment from the first electrolyte chamber 20. On the substantially opposite side of the partition 18, the second plurality of walls 66 may include a fourth plurality of interior walls 66b to define a first enclosure passageway 67. This fourth plurality of interior walls 66b extends between the connecting platform 54 and the partition 18 to provide a seal therebetween. The second plurality of interior support walls 66 may be in the form of substantially planar, vertical panels, joined along an edge to and extending between the partition 18 or horizontal connecting wall 68, and the platform 54. Formed upon an inside surface of the second plurality of interior support walls 66 are aligning ridges 177 for engagement with the partition member 18. Terminal 198, more fully described later in this application, passes through the partition 18 through a partition aperture 69 defined therein and the first enclosure passageway 67 to the storage compartment 44 from the second electrolyte chamber 22 for electrical connection with the cable 46. The partition aperture 69 is defined in part by flairing extensions 71 which extend downward from the partition 18 towards the second enclosure member 16 and aid in the insertion and passage of the terminals 198 therethrough. Potting 70 is placed about the terminals 198 atop the partition 18 to fluidly seal off the storage compartment 44 from the second electrolyte chamber 22.

As best shown in FIG. 5, a hollow mounting member 82 is suspended by a flexible connecting member 84 within the aperture defined by the retaining lips 62 and the end of the first communicating passageway 60. In the preferred embodiment, the mounting member 82 is in the form of a tubular sleeve having a longitudinal bore 83 therethrough. The connecting member 84 extends between the first interior support walls 58 and the mounting member 82 In addition, the connecting member 84 is a flexible, resilient, circular member which includes concentric annular undulations 86 formed therein and is peripherally mounted to the inside surface of the first support walls 58, or the lip 62. In vertical cross section there is at least one U-shaped undulation 86 formed within the connecting member 84. The U-shaped undulations 86 are partially radially compressed when the connecting member 84 is positioned closest to the partition 18, i.e., when the valve assembly 24 is closed, and fully compressed when the connecting member 84 is perpendicular to the support walls 58. As a result, the compression and resiliency of the connecting member 84 creates a radial biasing. Since the periphery of the connecting member 84 is mounted to the first support wall 58, the compression and resiliency of the connecting member 84 urges the centrally mounted but movable mounting member 82 towards the partition 18 to remain in the closed or first position. By this construction the mounting member 82, and thus the connecting member 84, is predisposed to remain in the first or closed position relatively adjacent to partition 18, as shown in FIG. 3. After the connecting member 84 is forced upward beyond a certain point, the radial biasing may aid the outward movement of the mounting member 82 away from the partition 18. For example, when the interior edge of the connecting member moves outward past the generally horizontal plane defined by the exterior most portions of the connecting member 84, the radially outward biasing may push the connecting member 82 outward.

Referring again to FIG. 5, rotatably mounted about the mounting member 82 and positioned above the connecting member 84 is a knob or handle 90. The knob 90 includes a central hub 92 having a receiving aperture 94 sized to fit slidably over the mounting member 82. A connecting disc 96 extends radially outward from the hub 92. In the preferred embodiment, the disc 96 has a planar bottom surface suspended and spaced apart from the top edge of the first interior support wall 58.

Ears 100 extend upward and outward from the disc 96 to help manipulate the knob 90 by providing a surface generally orthogonal to the desired direction of rotation about the central longitudinal axis of the knob. In addition, the ears 100 are sized to extend upward, away from the disc 96. The ears 100 are sized to fit within the confines of the interior of the upper enclosure member 14 so that when casing cap 30 is placed atop the neck 40, the cap is closely adjacent to the ears 100 of the rotatable knob 90 and thus maintain the mounting member 82 in the closed position, if for example the system 10 was jarred.

Referring again to FIG. 5, a plurality of fins 102 extend outward or downward from the plane of the disc 96, in a second direction generally opposite from that of the ears 100, i.e., downward or towards the connecting member 84. These generally triangular fins 102 slope outward from the disc 96 to a fin apex adjacent the hub 92. By this construction, when the valve assembly 24 is in the closed position, the fins 102 are adjacent to or abut the top surface of the connecting member 84, urging or maintaining the connecting member towards the partition 18, helping retain the valve assembly 24 in the closed position.

As best shown in FIGS. 6–9, a rim 104, having a first or joined end 106 and a second or free end 108, depends down from the periphery of the disc 96. In addition the rim 104 is coaxial with and fitted over the distal end of the first interior support wall 58. The second or free end 108 of the rim 104 terminates in an undulating distal edge 110.

As best shown in FIGS. 8 and 9, the undulating edge 110 has a surface which slopes between a pair of oppositely disposed first apices 112 and a pair of interposed first nadirs 114. For the purposes of clarity the first apices 112 and nadirs 114 are defined as the portions of edge most and least remote, respectively, from the disc 96. In the preferred form, each nadir 114 is substantially opposite or equidistantly disposed from one another with the apices 112 formed in the surface about ninety degrees relative the nadirs. To engage with the knob 90 to provide a ramping action to open the valve assembly 24, a camming shelf 118 is formed within an outer surface 116 of the interior support wall 58 for abutment with the undulating edge 110. The camming surface 120 of the camming shelf 118 correspondingly undulates about the exterior of the first interior support wall 58 and includes a pair of oppositely disposed second nadirs 122 and apices 124 which are positioned, when the valve assembly 24 is closed, to correspond, respectively with the first apices 112 and the first nadirs 114. For the purposes of clarity the second apices 124 and nadirs 122 are defined as portions of the camming shelf 118 most and least remote, respectively, from the second enclosure member 16. Formed within each of the first apices 112 is a knob notch 125. The knob notch 125 is positioned and sized to receive the second apices 124, locking the first apices 112 in a position adjacent the second apices. In the preferred embodiment the shelf 118 is formed by a Z-shaped bend, in vertical cross-section, within the support wall 58 to retain a constant wall width. In addition, the rim 104 is formed to slidably receive the distal end of the support wall 58 and abut portions of the camming shelf 118.

When the knob 90 is rotated, the undulating edge 110 abuts with the camming shelf 118 and ramps the knob 90 up the camming shelf 118. As the first knob apices 112 move along the camming shelf from adjacent the second nadir 122 towards the second apices 124, the knob 90 is urged upward, away from the first or closed position towards the second or open position, moving the attached mounting member 82 along with it. Indeed, as the knob rotates away from engagement as described above, the fins 102 move further apart from the flexible connecting member 84 to allow the connecting member to move away from the closed position to the open position. Upon reclosing of the value assembly 24, the fins would abut and urge the connecting member 84 to the closed or second position.

Figure 5A:
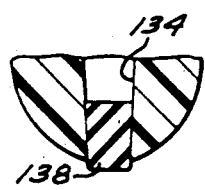
FIG. 5a is an enlarged fragmentary sectional view of the present invention, taken substantially from the circle 5a of FIG. 5.

Referring again to FIG. 5, selectively fluidly communicating the first chamber 20, with the second chamber 22, is the valve assembly 24. The valve assembly 24 includes a valve 130 snugly engaged within the longitudinal bore 83 of the mounting member 82. The valve 130 has a stem 132 which extends from the mounting member 82 towards the partition 18, for example between about three-fourths of an inch to about four-fifths of an inch. In one embodiment, a valve stem bore 134 extends substantially the entire longitudinal length of the valve stem 132 to terminate at an end wall 136. The valve stem bore 134, may be tapered so that the diameter of the bore decreases with increasing distance into the stem 132. In one embodiment, the end wall 136 is about two one-thousandths of an inch thick. A plug 138 is inserted into the bore 134 to abut the end wall 136. As best shown in FIG. 5A, during the manufacturing process the plug 138 may be extended through the end wall prior to release to the operator. In other embodiments, the plug may be inserted along the bore 134. The plug 138 may be formed of any gas permeable, flame retardant material, for example sintered polypropylene or polytetrafluoroethylene (PTFE). If the electrolyte distribution system 10 is to be recharged by the operator, the plug 138 provides a communicating passageway for the venting of gases generated during a battery recharging procedure.

Referring again to FIG. 5, in the preferred embodiment, after the valve stem 132 is inserted through the mounting member 82 and the central hub 92, a hot searing device may be applied to the stem to melt a portion of the valve stem 132 joining the valve 130 to the mounting member 82 and forming a retaining lip 140. The retaining lip 140 flairs radially outward from the stem 132 to extend over the hub 92 to rotatably mount and retain the knob 90 upon the mounting member 82. In one embodiment a washer (not shown) is interposed between the retaining lip 140 and the hub 92.

Extending from the valve stem 132 towards the partition member 18 is a first or central valve body 144. The central valve body 144 extends coaxially and longitudinally from the valve stem and is configured to sealingly engage with the partition 18. While in the preferred embodiment, the first valve body 144 is in the form of a hemispherical member, any sloping surface configuration can be present. For example, a frustro-conical configuration terminating in generally planar end surface, can be used.

Flaring radially outward from the valve stem 132, adjacent the central valve body 144, is a mounting ledge 148. The mounting ledge 148 has an outside diameter sized to fit within the first support walls 58, but extends radially outward beyond the periphery of the central valve body 144. Formed within the mounting ledge 148 is an annular receiving groove 146. Extending longitudinally outward from the mounting ledge 148 towards the partition 18 are a plurality of valve fingers 150, circumferentially disposed, about the central valve body 144. While the exact number of fingers 150 varies according to the desires of the operator, in one preferred embodiment, there are eight valve fingers 150 equidistantly disposed radially about the central valve body 144.

As best shown in FIG. 5, the partition 18, includes generally planar platform 152 mounted to the open end 50 of the upper enclosure member 16. Formed and positioned within the partition 18 to selectively engage with the central valve body 144 and valve fingers 150 are central valve seat 154 and peripheral valve seats 156, to correspondingly and selectively engage with the central valve body 144 and the valve fingers 150. Extending outward from the planar platform 152 of the partition 18 and hence towards the valve 130, the mounting member 82 and the knob 90, into the upper enclosure member 14 is a central tower 158. The central tower 158 defines a central communicating tower bore 160 which terminates in a first or remote end 162 and the central valve seat 154. The central tower 158 extends upward from the platform 152 of the partition 18 a sufficient distance so that the first valve body 144 axially aligns and sealingly engages with the central valve seat 154 and receives the tower first end 162 within the annular receiving groove 146 when the valve 130 is positioned in the first or closed position, as shown in FIG. 5. While height of the tower may vary according to the selected respective dimensions of the vertical support walls 58 the valve member 24 and the partition 18, in the preferred embodiment, the central tower 158 may extend upward about three fourths of an inch into the first chamber 20 from the platform 152 of the partition 18.

The central communicating bore 160 formed within the tower 158, selectively and fluidly connects the first and second chambers 20 and 22 respectively. A plurality of peripheral passageways 166 are formed radially outward from the central tower 158 within the partition platform 152 for selective fluid communication of the first interior chamber 20 and the second interior chamber 22. By this construction, the peripheral passageways 166 open into first electrolyte chamber 20 at a lower level than the entrance to the central communicating passageway 160. Nipples 168, formed at the terminating end of each communicating peripheral passageway 166 extend outward from the platform 152 towards the second enclosure member 16 to direct the downward flow of the electrolytic medium 26 from each peripheral passageway 166 and to minimize any unintentional lateral dispersal of the electrolytic medium being communicated therethrough.

Formed within each of the peripheral passageways 166 is the plurality of second or peripheral valve seats 156 for selective sealing engagement with the valve fingers 150. As best shown in FIG. 10, the peripheral passageways 166 gently curve radially inward to create a smooth transition surface between the inner surface of the passageway and the second valve seats 156. Furthermore, each peripheral valve seat 156 has an interior diameter size to snugly engage with the outer diameter of the valve fingers 150, to seal each passageway and preclude any fluid communication therethrough. In the preferred embodiment, the inside surface of the peripheral valve seats 156 may narrow from each opposing opening to a smaller constricting inner diameter about mid-way between each opposite opening to provide, in vertical cross-section, a convex valve seat surface. The inside diameter of the constricting concave peripheral valve seat 156 maybe less than the outside diameter of the valve finger 150 to insure a fluid seal despite the possible formation of residual molding flash thereon with the use of moldable materials.

Referring now to FIG. 11, the partition 18 includes substantially vertical divider walls 170 extending upward from the partition platform 152 into the first interior chamber 20. Ejector pin shapes 171 may be formed within the vertical divider walls 170 to facilitate dislodging the molded partition 18 from the mold. Furthermore the divider walls 170 extend radially outward from the central tower 158 which itself is coaxial with the central vertical axis of the valve assembly 24 and the casing 12, to substantially divide the interior of the first chamber 20 into approximately equal volumed cells 172. In the preferred embodiment there are eight cells 172, although any number of cells can be used. By this construction, when the partition 18 is substantially aligned above the lower enclosure member 16, each peripheral passageway 166 is positioned above a respective cell. Peripheral partition walls 174 circumvent the interior walls 170 and the central core 158. These walls 174 extend outward a short distance from the platform 154 to seal the partition 18 with corresponding walls of the upper enclosure member 14, for example the second plurality of interior support walls 66. Portions of the peripheral partition walls correspondingly bend inward with the support walls 60 to separate the first chamber 20 from the storage compartments 44. In addition, central vertical divider walls 176 extend outward from the tower 158 towards the peripheral partition walls for snuggly engaging with a generally vertical first aligning ridges 177 formed upon an interior surface of the first enclosure member 14 to define in part the cells 172 formed therein. End walls 178 may extend across the interior walls 170 to define portions of the cells 172. Second aligning ridges 179 may be formed within an inside surface of the first enclosure member 14 for proper alignment with the portion 18.

Referring now to FIG. 12, the casing 12, having a second central vertical axis, includes a second or lower enclosure member 16, having a first or enclosed end 180 and a second or open end 182. The lower enclosure member 16 includes a plurality of peripheral side walls 184 joined along their respective edges with each other and extending upward from a bottom wall 186 to define, together with the partition 18 the second electrolyte chamber 20. Each of the side walls 184 is flared radially outward along the second enclosure's open end 182 for engagement or abutment with partition 18. Extending outward from the partition 18 towards the second enclosure member 16 are reinforcing extensions 187. These extensions 187 are formed and positioned to abut with the inside surface of the side walls 184 to urge them outward and generally maintain the side walls in a planar configuration. These extensions 187, therefore help the side walls 184 and the partition 18 to create a seal, to reduce the leakage of the electrolyte solution 26 out of the system 10 and help prevent external pressure from breaking the seal. Furthermore, the second enclosure member 16 is generally sized to correspond to the first enclosure member, i. e., is about five and one quarter inches long, and about one and one half to about one and three quarters of an inch wide. The second enclosure member 16 may be about two and one quarter inches deep.

Extending upward a short distance from the surface of the bottom wall 186, substantially orthogonal to a plurality of generally vertical dividing walls 188 and a plurality of electrode plates 192 is a plurality of support ridges 200. In the preferred embodiment, the support ridges 200 extend upward about one-sixteenth of an inch from the top surface of the bottom wall 186. Resting upon the support walls 200 are the electrode plates 192. By positioning the electrode plates 192 atop the support ridges 200, additional electrode plate surface area is exposed for electrochemical current generation.

Referring now to FIG. 13, the lower enclosure 16 is subdivided by generally vertical interior dividing walls 188 into individual cells 190. In the preferred embodiment each dividing wall 188 has a first portion 204 extending radially outward from a central vertical axis. The central axis is coaxial with the central vertical axis of the casing 12 and the valve assembly 24. A second portion 206 of each dividing wall 188 extends from the first portion 204 generally parallel to the side walls 184 of the lower enclosure member 16. Each cell 190 is sized and positioned to correspond with corresponding cells 172 in the partition 18, and the first chamber 20. Since one peripheral passageway 166 fluidly connects each cell 190 with its corresponding cell 172, the electrolytic fluid 26 is distributed or dispersed, with the opening of the valve assembly 24, quickly and generally equally amongst each cell 190. The plurality of electrode plates 192 for selective immersion within the electrolytic medium 26 are disposed within each cell 190. For example, four conventional lead plates are inserted into each cell 190. Interposed between the electrode plates 192 are pads 194 to allow a wicking or absorption of the electrolytic medium 26, enabling the electrode plate 192 to contact an increased amount of electrolyte 26 with the electrode plates. For example, one type of absorbent wicking pads 194 are formed of fine fiberglass mat manufactured by Hollingsworth & Vose of East Walpole, Massachusetts. The electrode plates 192 are spaced laterally within the lower enclosure member from the peripheral communicating passageways 166, i.e., not directly beneath them, enabling the electrolytic medium 26 to be absorbed evenly upward from the bottom as each cell 190 fills. While lead plates are used in conjunction with sulfuric acid in the preferred embodiment, any appropriate metal for use with the desired electrolytic medium 26 may be used. The determination of the appropriate electrode and electrolytic solution can be determined from conventional sources describing the electrochemical series of elements; see for example

*McGraw-Hill Encyclopedia of Science and Technology*, Vol. 4, pages 469–470 (1st Edition 1960) which are incorporated by reference herein.

Referring to FIG. 13, extending from each electrode plate 192 is a lug 196, electrically connected by connector bars 197 to each other and thus complete an electrical circuit through terminal 198 to the connector cables 46. The connector bars 197 may be in the form of lead bars melted across the lugs 196 to form an electrical connection with the terminals 198. Extending interiorly from the sidewall 184, and positioned beneath the terminal 198 is a terminal support wall 202. These support walls 202 help maintain the vertical positioning of the terminals 198. Stops 206, extend inward from the sidewall 184 and are positioned adjacent terminal support walls 202 and the terminals 198, help maintain the horizontal positioning of the terminal 198.

Figure 15:
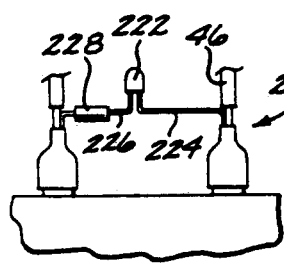
FIG. 15 is an enlarged fragmentary elevational view of the test circuit similar to that shown in FIG. 2.

As best shown in FIG. 15, a test circuit 220 may be connected between the cables 46. A light emitting diode (LED) 222 is electrically connected to the cables 46 by electrical connectors 224 and 226. A resistor 228 is electrically connected between LED 222 and one of the cables. By this construction, provided the system 10 is correctly connected to the proper terminals of the automobile battery, the LED 222 will be illuminated. In addition, if the connections between the terminals and posts of the vehicle's discharged battery (not shown) are loose or corroded, the unlit LED 222 will alert the operator to an electrical problem with their vehicle and to fix the problem before activating the electrolyte system 10. In addition, the incorporation of a capacitor (not shown) within the circuit would allow the LED 222 to flash intermittently with increasing frequency as the system 10 is raising the voltage of the vehicle's discharged battery.

In operation, the upper enclosure member 14 is mounted to the partition member 18 to form the first interior chamber 20 for receipt of the electrolytic medium 26 and align the upper enclosure member, lower enclosure member and partition along their respective central vertical axes. The electrolytic medium 26 is then initially put into the first chamber 20 through the central communicating passageway 160 of the central tower 158. The valve 130 is moved or set in the second or open position to allow the electrolytic solution 26 to flow through the central communicating tower bore 160 into the first chamber 20. The sloping face of the central valve body 144 deflects the inward flow of the electrolytic medium 26, thus minimizing the initial splashing which occurs during the transfer of the fluid into the first chamber 20. The valve 130 is then moved into the first or sealed position, and thus sealingly engaging the central valve body 144 and the valve fingers 150 with the central valve seat 154 and the peripheral valve seats 156, respectively, fluidly sealing off the first chamber 20.

The amount of electrolytic solution 26 varies with respect to the specific construction and requirements of the particular electrolytic distribution system 10. However, in the preferred embodiment, the amount of initial electrolytic solution inserted into the first chamber 20 is of a volume to have an upper level below the entrance of the central tower communicating bore 160 when the casing 12 is reinverted into a normal upright position. The lower enclosure member 16 and partition member 18 are then positioned or aligned relative to each other so that each respective peripheral passageway 166 is disposed above the corresponding subdivisions or cells 190 in the lower enclosure member 16. The casing 12 is then sealably joined to define the second electrolyte chamber 22 for subsequent receipt of the electrolytic medium 26. The casing cap 30 is engaged with the upper enclosure member 14 to urge or maintain the valve assembly 24 in the closed position. The electrolytic distribution system 10 is now ready for storage.

When a fresh charge is desired, for example, when the operator has drained the motor vehicle's primary battery leaving on the headlights or other accessories, the casing cap 30 is removed, exposing the valve assembly 24, the rotatable knob 90, and the connector cables 46. The knob 90 is rotated or twisted about a central longitudinal axis by applying torque to the knob through the ears 100.

As best shown in FIGS. 6–9, when the knob 90 is rotated about its longitudinal axis, the rim's first apices 112 will slide atop the camming shelf 118. If the operator continues to rotate the handle, the slope of the camming shelf 118 will urge the knob 90 coaxially upwards away from the partition 18.

As best shown in FIGS. 4 and 14, the central valve body 144, and valve fingers 150 are disengaged from the central valve seat 154 and peripheral valve seats 156, allowing the electrolytic medium 26 to flow from the first chamber 20 down through the peripheral communicating passageways 166 and into the individual cells 190 of the lower enclosure member 16. As earlier described the electrolytic medium 26 is substantially equally distributed amongst the individual cells 190 by the novel construction of the present invention. Since the level of the electrolytic medium 26 is below the top opening of the central tower communicating bore 160, as the medium flows from the first chamber 20 downward into the second chamber 22, air may flow upward through the central bore into the first chamber 20 to replace the transferred electrolytic medium 26. This facilitates a smooth flowing of the electrolytic medium 26 from the first chamber 20 to the second chamber 22 and thus minimizes the splashing or bubbling therein. As a result, the electrolytic medium 26 is placed into contact with the electrode plates 192, disposed within the lower enclosure member 16, enabling the commonly known electrochemical reactions to generate an electrical current. The current is then carried by the lugs 196, terminals 198 and connector cables 46 outward to provide a charge which is able to jump start a conventional motor vehicle.

While particular forms of the auxiliary battery embodying the novel features of the present invention have been illustrated and described in some detail herein, various modifications may be made without departing from the spirit and scope of the present invention. Accordingly, it is not intended that the invention be limited except by the appended claims.

What is claimed is:

1. A battery comprising:
    a casing, said casing including a first and a second enclosure members, said second enclosure member including a plurality of cells formed therein:
    an electrolytic fluid, said electrolytic fluid initially disposed within said first enclosure member;
    a plurality of electrode plates mounted within said second enclosure member, at least one of said electrode plate mounted within each said plurality of cells;
    partition means for selectively separating said electrolytic fluid from said plurality of electrodes, said partition means including valve means for selectively, fluidly connecting said first and second enclosure members, said valve means including a valve member, a valve body and ramping means for vertically displacing said valve member from said valve body; and dispersing means for distributing said electrolytic fluid substantially equally between said plurality of cells when said valve means fluidly connects said first and second enclosure members.

2. A storable battery comprising:

an electrolytic fluid;

a first enclosure member having outer peripheral walls, a first enclosure central vertical axis, a vertical cylindrical support wall defining a first enclosure central passageway, and plural connecting walls extending between said outer peripheral walls and said vertical support wall;

a mounting member suspended within said first enclosure central passageway;

ramping means for moving said mounting member from a first position to a second position;

a second enclosure member having a second enclosure central vertical axis, a bottom wall, and a plurality of dividing walls, said plurality of dividing walls extending upward from said bottom wall, said dividing walls having portions extending radially outward from said second enclosure central vertical axis to define a plurality of individual cells within said second enclosure member;

a plurality of electrode plates, at least one of said electrode plates disposed within each said individual cells defined within said second enclosure, said electrode plates reactive with said electrolytic fluid to generate an electrical current;

cables electrically connected to said electrode plates, said cables extending outside of said second enclosure member;

a partition having a partition central vertical axis and mounted to said first and said second enclosure members such that said partition and said enclosure members are substantially vertically aligned along their respective central vertical axes, said partition and said first enclosure member together defining a first chamber, said electrolytic fluid disposed within said first chamber and said partition and said second enclosure member together defining a second chamber for receipt of said electrolytic fluid;

a plurality of valve seats formed within said partition, said partition having a vertical tower and a platform, said vertical tower extending outward from said platform and defining a central communicating bore therethrough, said central communicating bore coaxially aligned with said partition central vertical axis, said platform having a plurality of peripheral passageways formed therethrough, each said peripheral passageways disposed radially about said central communicating bore and positioned above said individual cells, said peripheral passageway numbering the same as the number of individual cells defined with said second enclosure member to fluidly connect said first chamber with each of said individual cells defined within said second enclosure member; and a valve mounted to said mounting member, said valve including a central valve body and a plurality of valve fingers extending outward therefrom, said valve body and fingers positioned and configured to sealingly engage with said valve seats formed within said partition, such that when said valve is moved from said first position to said second position, said electrolytic fluid may flow from said first chamber within said first enclosure member into said second chamber within said enclosure member immersing said electrode plates in said electrolytic fluid, generating an electrical current.

* * * * *